(12) United States Patent
Chang (10) Patent No.: US 7,651,072 B1
(45) Date of Patent: Jan. 26, 2010

(54) CABLE TIGHTENING DEVICE WITH A BASE HAVING A LOWER COST OF FABRICATION

(76) Inventor: Wen-Cheng Chang, 2, Lane 276, Sec. 5, Zhangnan Rd., Changhua City (TW)

( * ) Notice: Subject to any disclaimer, the term of this patent is extended or adjusted under 35 U.S.C. 154(b) by 0 days.

(21) Appl. No.: 12/197,376

(22) Filed: Aug. 25, 2008

(51) Int. Cl.
*B21F 9/00* (2006.01)

(52) U.S. Cl. ................. 254/218; 254/223; 254/239; 410/103; 410/100; 24/68 CD; 24/70 ST; 24/69 ST (58) Field of Classification Search ............. 254/213, 254/217, 218, 222, 223, 238, 239; 410/96, 410/100, 103, 97; 24/68 R, 68 CD, 68 B, 24/70 ST, 69 ST, 69 CT, 71 R, 71 ST
See application file for complete search history.

(56) References Cited

U.S. PATENT DOCUMENTS

| | | | | |
|---|---|---|---|---|
| 4,542,883 A * | 9/1985 | Rutzki | ................ | 254/217 |
| 4,582,165 A * | 4/1986 | Latini | ................ | 182/20 |
| 5,655,623 A * | 8/1997 | Skyba | ................ | 182/116 |
| 5,904,341 A * | 5/1999 | Norrby | ................ | 254/243 |
| 6,053,278 A * | 4/2000 | Myers | ................ | 182/20 |
| 6,631,537 B1 * | 10/2003 | Huang | ................ | 24/193 |
| 6,648,301 B2 * | 11/2003 | Lee | ................ | 254/218 |
| 7,296,658 B1 * | 11/2007 | Pederson | ................ | 182/133 |
| 7,360,753 B1 * | 4/2008 | Lin | ................ | 254/218 |
| 7,444,720 B2 * | 11/2008 | Huang | ................ | 24/170 |
| 7,448,596 B1 * | 11/2008 | Chang | ................ | 254/223 |
| 7,476,149 B2 * | 1/2009 | Burrows | ................ | 452/187 |
| 7,503,546 B1 * | 3/2009 | Seager | ................ | 254/218 |
| 7,510,168 B1 * | 3/2009 | Lin | ................ | 254/218 |
| 2003/0146424 A1 * | 8/2003 | Lee | ................ | 254/237 |
| 2007/0256892 A1 * | 11/2007 | Breedlove, Sr. | ................ | 182/116 |

* cited by examiner

*Primary Examiner*—Emmanuel M Marcelo
(74) *Attorney, Agent, or Firm*—Alan Kamrath; Kamrath & Associates PA (57) ABSTRACT

A cable tightening device includes a fixed unit including a base, a rotation member rotatably mounted on a first end of the base, a movable unit including a movable member rotatably mounted on the rotation member and movable relative to the base, and a holding member secured on a second end of the base. Thus, the base of the fixed unit is integrally combined with the holding member without having to provide a bolt and a nut, thereby decreasing the costs of fabrication. In addition, the holding member is integrally combined with the base of the fixed unit by punching so that the holding member will not detach from the base of the fixed unit, thereby facilitating operation of the cable tightening device.

17 Claims, 8 Drawing Sheets

CABLE TIGHTENING DEVICE WITH A BASE HAVING A LOWER COST OF FABRICATION

BACKGROUND OF THE INVENTION

1. Field of the Invention

The present invention relates to a cable tightening device and, more particularly, to a cable tightening device for tightening or loosening a cable so as to bind or release a cargo.

2. Description of the Related Art

A cable tightening device is mounted on a wheeled vehicle having a larger size, such as a truck or the like, to tighten a cable which is wound around a cargo so as to tighten the cargo.

Figure 8:
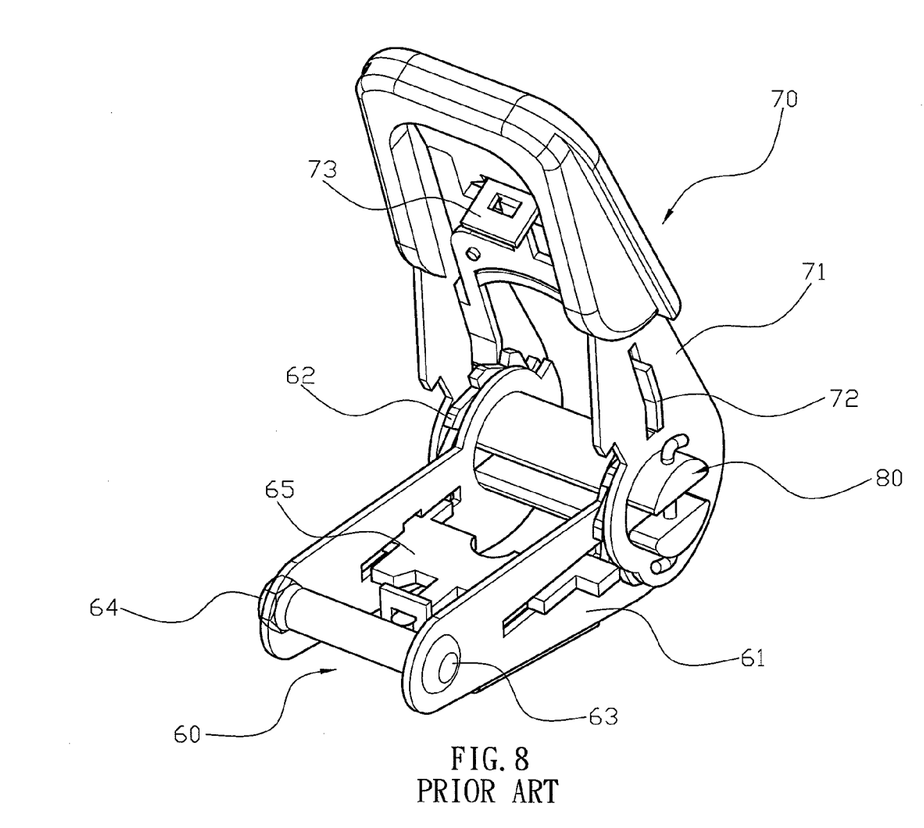
FIG. 8 is a perspective view of a conventional cable tightening device in accordance with the prior art.

A conventional cable tightening device in accordance with the prior art shown in FIG. 8 comprises a fixed unit 60 including a base 61, a rotation member 80 rotatably mounted on the base 61 of the fixed unit 60 to wind and unwind a cable (not shown) by rotation of the rotation member 80, and a movable unit 70 including a movable member 71 rotatably mounted on the rotation member 80 and movable relative to the base 61 of the fixed unit 60 to drive the rotation member 80 to rotate relative to the fixed unit 60 in a one-way direction. The fixed unit 60 further includes two opposite ratchet wheels 62 secured on two opposite ends of the rotation member 80 to rotate the rotation member 80, and a stop plate 65 movably mounted on the base 61 and releasably engaged with the ratchet wheels 62 to allow the ratchet wheels 62 to rotate in a oneway direction. The base 61 of the fixed unit 60 has a distal end provided with a bolt 63 and a nut 64. The movable unit 70 further includes a push plate 72 movably mounted on the movable member 71 and releasably engaged with the ratchet wheels 62 of the fixed unit 60 to push the ratchet wheels 62 of the fixed unit 60 to rotate in a oneway direction, and a release member 73 mounted on a side of the push plate 72 to pull the push plate 72 to move relative to the ratchet wheels 62 of the fixed unit 60 so as to lock the movable member 71 of the movable unit 70 onto the base 61 of the fixed unit 60 or to unlock the movable member 71 of the movable unit 70 from the base 61 of the fixed unit 60. Thus, the release member 73 of the movable unit 70 is pulled outwardly to pull the push plate 72 to detach from the ratchet wheels 62 of the fixed unit 60 and to unlock the movable member 71 of the movable unit 70 from the base 61 of the fixed unit 60 so that the push plate 72 of the movable unit 70 skips the ratchet wheels 62 of the fixed unit 60 when the movable member 71 of the movable unit 70 is rotatable on the rotation member 80 to move toward the base 61 of the fixed unit 60.

In operation, when the movable member 71 of the movable unit 70 is pivoted toward the base 61 of the fixed unit 60, the push plate 72 of the movable unit 70 is moved with the movable member 71 to push and rotate the ratchet wheels 62 which rotates the rotation member 80 relative to the base 61 of the fixed unit 60. On the contrary, when the movable member 71 of the movable unit 70 is pivoted outwardly relative to the base 61 of the fixed unit 60, the push plate 72 of the movable unit 70 passes by the ratchet wheels 62 so that the rotation member 80 is not rotated by the push plate 72 of the movable unit 70. Thus, when the movable member 71 of the movable unit 70 is pivoted relative to the base 61 of the fixed unit 60 in a reciprocal manner, the push plate 72 of the movable unit 70 is moved with the movable member 71 to push the ratchet wheels 62 to rotate in a oneway direction so that the rotation member 80 is rotated successively in a oneway direction to wind the cable successively so as to tighten a cargo.

In assembly, an extension strap (not shown) has a first end mounted on the bolt 63 of the base 61, and a snapping hook (not shown) is mounted on a second end of the extension strap and is hooked on a wheeled vehicle, such as a truck and the like, so that the base 61 of the fixed unit 60 is attached to and supported by the wheeled vehicle via the extension strap and the snapping hook before the cable is tightened.

However, it is necessary to provide the bolt 63 and the nut 64 for mounting the extension strap and the snapping hook, thereby increasing the costs of fabrication. In addition, it is necessary to mount the bolt 63 and the nut 64 on the base 61 of the fixed unit 60, thereby greatly causing inconvenience in assembly of the cable tightening device. Further, the nut 64 is easily unscrewed from the bolt 63 during a long-term utilization, thereby causing inconvenience in operation of the cable tightening device.

BRIEF SUMMARY OF THE INVENTION

In accordance with one embodiment of the present invention, there is provided a cable tightening device, comprising a fixed unit including a base, a rotation member rotatably mounted on a first end of the base of the fixed unit, a movable unit including a movable member rotatably mounted on the rotation member and movable relative to the base of the fixed unit to drive the rotation member to rotate relative to the fixed unit in a oneway direction, and a holding member secured on a second end of the base of the fixed unit.

The primary objective of the present invention is to provide a cable tightening device with a base having a lower cost of fabrication. Another objective of the present invention is to provide a cable tightening device, wherein the base of the fixed unit is integrally combined with the holding member without having to provide a bolt and a nut, thereby saving the price of material and thereby decreasing the costs of fabrication.

A further objective of the present invention is to provide a cable tightening device, wherein the holding member is integrally combined with the base of the fixed unit by punching without having to mount the holding member on the base of the fixed unit in a manual manner, thereby facilitating assembly of the cable tightening device.

A further objective of the present invention is to provide a cable tightening device, wherein the holding member is integrally combined with the base of the fixed unit by punching so that the holding member will not detach from the base of the fixed unit, thereby facilitating operation of the cable tightening device.

Further benefits and advantages of the present invention will become apparent after a careful reading of the detailed description with appropriate reference to the accompanying drawings.

DETAILED DESCRIPTION OF THE INVENTION

Figure 1:
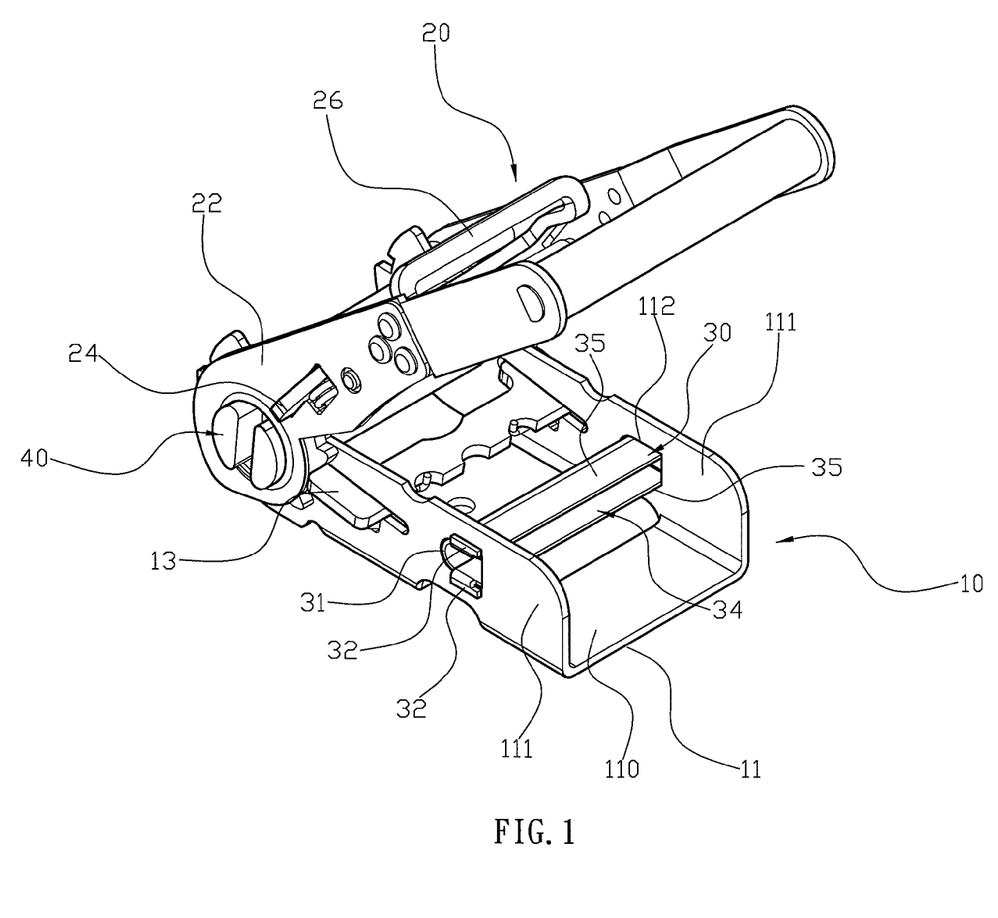
FIG. 1 is a perspective view of a cable tightening device in accordance with the preferred embodiment of the present invention.
Figure 2:
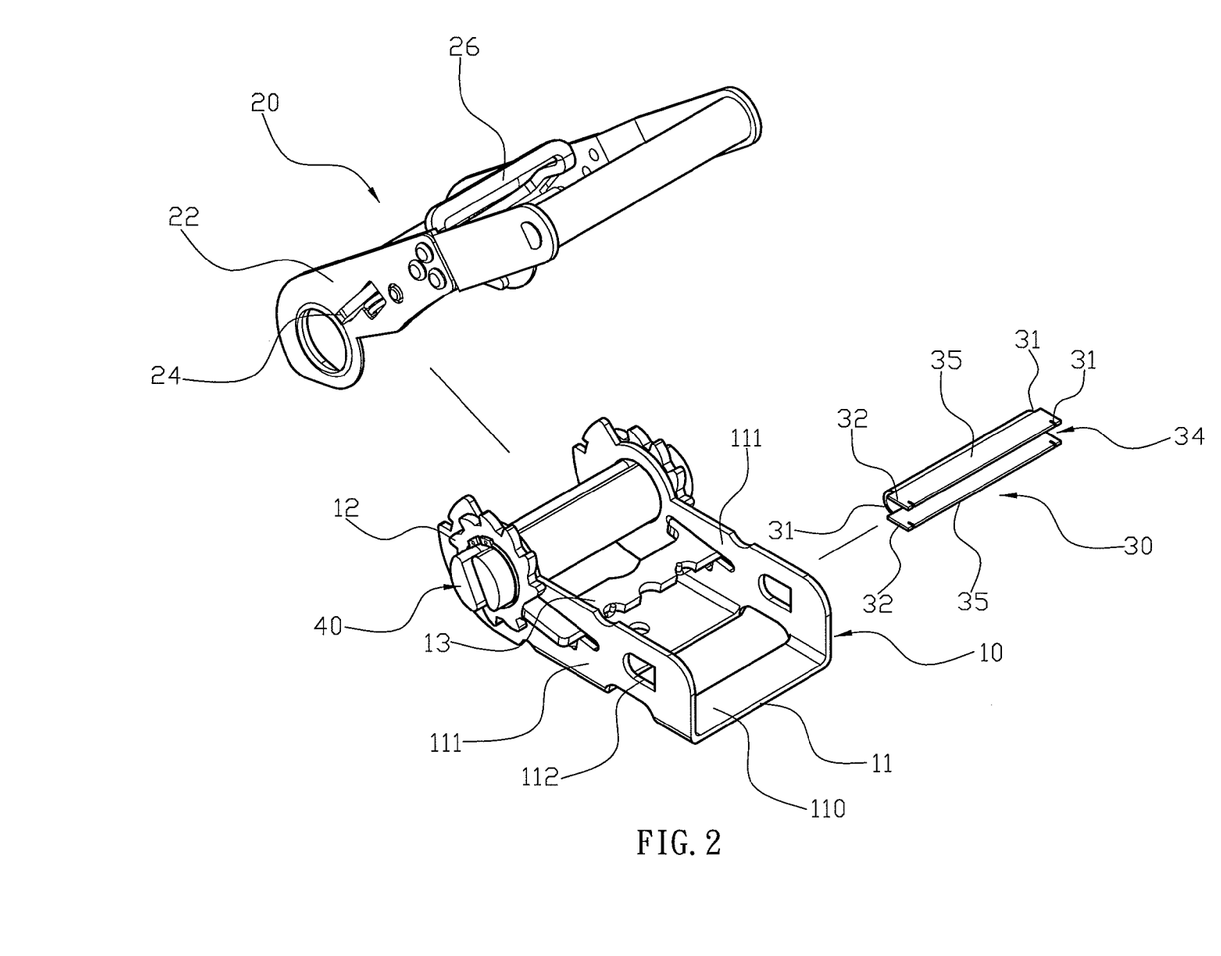
FIG. 2 is an exploded perspective view of the cable tightening device as shown in FIG. 1.

Referring to the drawings and initially to FIGS. 1 and 2, a cable tightening device in accordance with the preferred embodiment of the present invention comprises a fixed unit 10 including a base 11, a rotation member 40 rotatably mounted on a first end of the base 11 of the fixed unit 10 to wind and unwind a cable (not shown) by rotation of the rotation member 40, a movable unit 20 including a movable member 22 rotatably mounted on the rotation member 40 and movable relative to the base 11 of the fixed unit 10 to drive the rotation member 40 to rotate relative to the fixed unit 10 in a oneway direction, and a holding member 30 secured on a second end of the base 11 of the fixed unit 10.

The fixed unit 10 further includes two opposite ratchet wheels 12 secured on two opposite ends of the rotation member 40 to rotate the rotation member 40, and a stop plate 13 movably mounted on the base 11 and releasably engaged with the ratchet wheels 12 to allow the ratchet wheels 12 to rotate in a oneway direction.

The movable unit 20 further includes a push plate 24 movably mounted on the movable member 22 and releasably engaged with the ratchet wheels 12 of the fixed unit 10 to push the ratchet wheels 12 of the fixed unit 10 to rotate in a oneway direction, and a release member 26 mounted on a side of the push plate 24 to pull the push plate 24 to move relative to the ratchet wheels 12 of the fixed unit 10 so as to lock the movable member 22 of the movable unit 20 onto the base 11 of the fixed unit 10 or to unlock the movable member 22 of the movable unit 20 from the base 11 of the fixed unit 10. Thus, the release member 26 of the movable unit 20 is pulled outwardly to pull the push plate 24 to detach from the ratchet wheels 12 of the fixed unit 10 and to unlock the movable member 22 of the movable unit 20 from the base 11 of the fixed unit 10 so that the push plate 24 of the movable unit 20 skips the ratchet wheels 12 of the fixed unit 10 when the movable member 22 of the movable unit 20 is rotatable on the rotation member 40 to move toward the base 11 of the fixed unit 10.

In operation, when the movable member 22 of the movable unit 20 is pivoted toward the base 11 of the fixed unit 10, the push plate 24 of the movable unit 20 is moved with the movable member 22 to push and rotate the ratchet wheels 12 which rotates the rotation member 40 relative to the base 11 of the fixed unit 10. On the contrary, when the movable member 22 of the movable unit 20 is pivoted outwardly relative to the base 11 of the fixed unit 10, the push plate 24 of the movable unit 20 passes by the ratchet wheels 12 so that the rotation member 40 is not rotated by the push plate 24 of the movable unit 20. Thus, when the movable member 22 of the movable unit 20 is pivoted relative to the base 11 of the fixed unit 10 in a reciprocal manner, the push plate 24 of the movable unit 20 is moved with the movable member 22 to push the ratchet wheels 12 to rotate in a oneway direction so that the rotation member 40 is rotated successively in a oneway direction to wind the cable successively so as to tighten a cargo.

The base 11 of the fixed unit 10 is made of a metallic sheet plate. The base 11 of the fixed unit 10 has a substantially U-shaped profile and has two opposite sidewalls 111 and a bottom wall 110 located between the two opposite sidewalls 111. The bottom wall 110 of the base 11 has a solid structure. Each of the two sidewalls 111 of the base 11 is provided with a locking slot 112. The locking slot 112 of each of the two sidewalls 111 of the base 11 has a shape matching a cross-sectional profile of the holding member 30.

The holding member 30 is located between the two sidewalls 111 of the base 11 and is inserted into the locking slot 112 of each of the two sidewalls 111 of the base 11. The holding member 30 is disposed at a transverse state and is parallel with and spaced from the bottom wall 110 of the base 11. The holding member 30 has two opposite sides 35 spaced from each other and each having two opposite ends each provided with a bent locking piece 32 protruding outwardly from the locking slot 112 of a respective one of the two sidewalls 111 of the base 11 and closely locked onto an outer face of the respective sidewall 111 of the base 11. Each of the two opposite sides 35 of the holding member 30 is a flat sheet plate. The holding member 30 has two opposite ends each provided with at least one cutout 31 connected to the locking slot 112 of the respective sidewall 111 of the base 11 and located beside the bent locking piece 32 to define the bent locking piece 32 by punching. The holding member 30 has a hollow inside provided with an opening 34 connected to the at least one cutout 31 and directed outwardly and rearward relative to the rotation member 40. Thus, the holding member 30 has two opposite sides 35 each having two opposite ends each provided with a bent locking piece 32 closely locked onto the respective sidewall 111 of the base 11, so that the holding member 30 locked between the two sidewalls 111 of the base 11 and is combined with the base 11 integrally.

Figure 3:
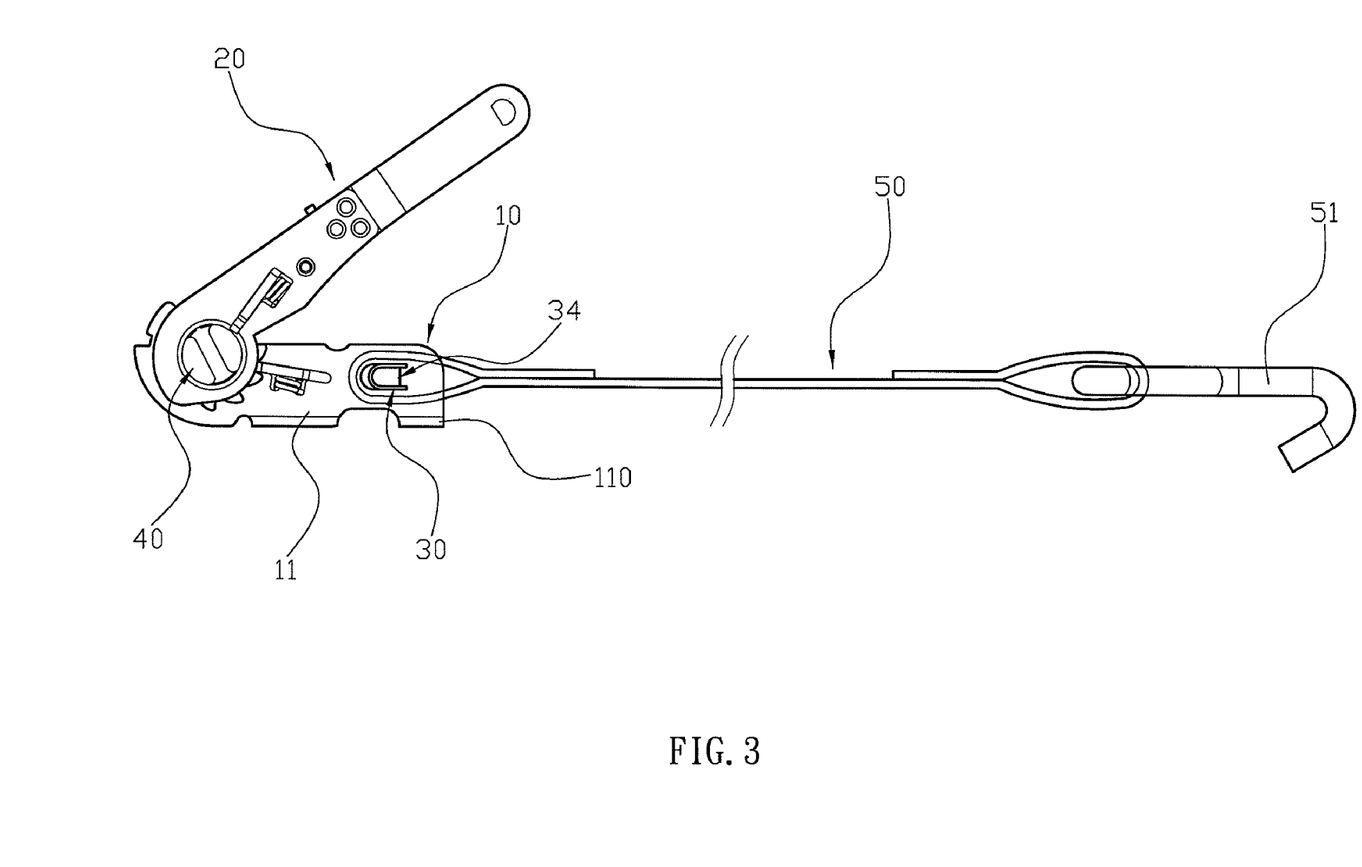
FIG. 3 is a side view of the cable tightening device as shown in FIG. 1.

As shown in FIG. 3, an extension strap 50 has a first end mounted on the holding member 30, and a snapping hook 51 is mounted on a second end of the extension strap 50 and is hooked on a wheeled vehicle, such as a truck and the like, so that the base 11 of the fixed unit 10 is attached to and supported by the wheeled vehicle via the extension strap 50 and the snapping hook 51 before the cable is tightened.

Accordingly, the base 11 of the fixed unit 10 is integrally combined with the holding member 30 without having to provide a bolt and a nut, thereby saving the price of material and thereby decreasing the costs of fabrication. In addition, the holding member 30 is integrally combined with the base 11 of the fixed unit 10 by punching without having to mount the holding member 30 on the base 11 of the fixed unit 10 in a manual manner, thereby facilitating assembly of the cable tightening device. Further, the holding member 30 is integrally combined with the base 11 of the fixed unit 10 by punching so that the holding member 30 will not detach from the base 11 of the fixed unit 10, thereby facilitating operation of the cable tightening device.

As shown in FIGS. 1-3, the holding member 30 has a substantially U-shaped profile.

Figure 4:
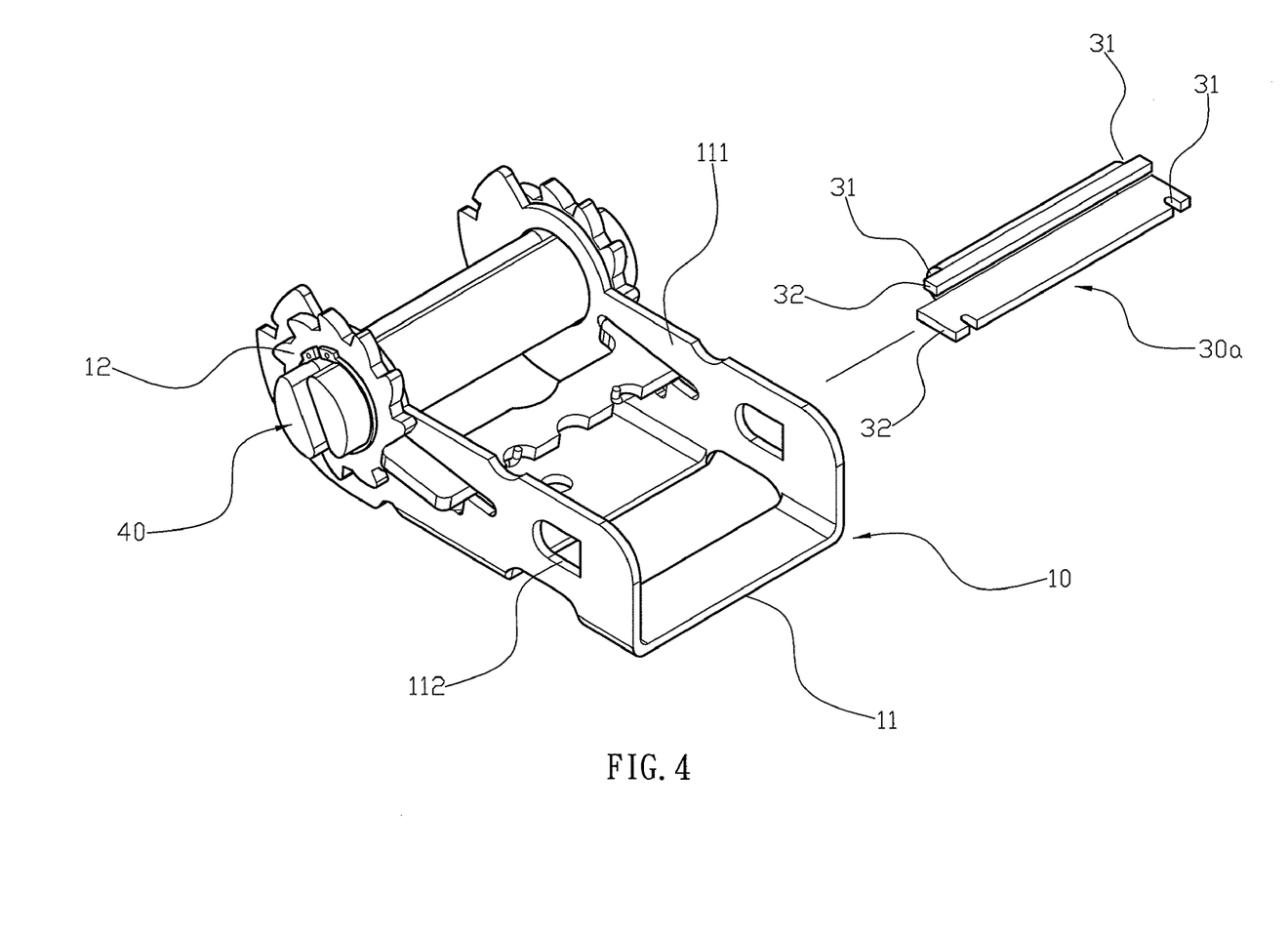
FIG. 4 is an exploded perspective view of a cable tightening device in accordance with another preferred embodiment of the present invention.

As shown in FIG. 4, the holding member 30a has a substantially J-shaped profile.

Figure 5:
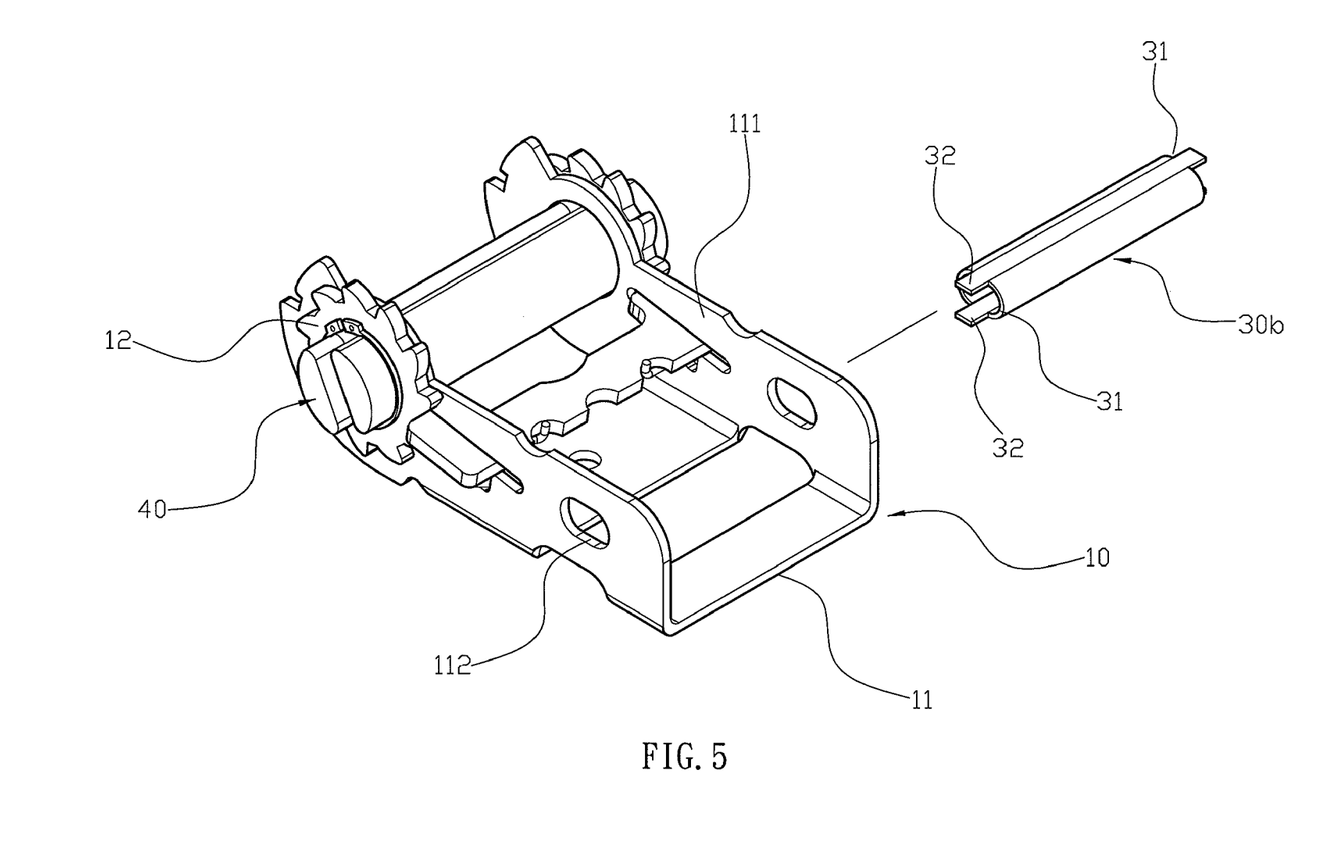
FIG. 5 is an exploded perspective view of a cable tightening device in accordance with another preferred embodiment of the present invention.

As shown in FIG. 5, the holding member 30b has a substantially oblong profile.

Figure 6:
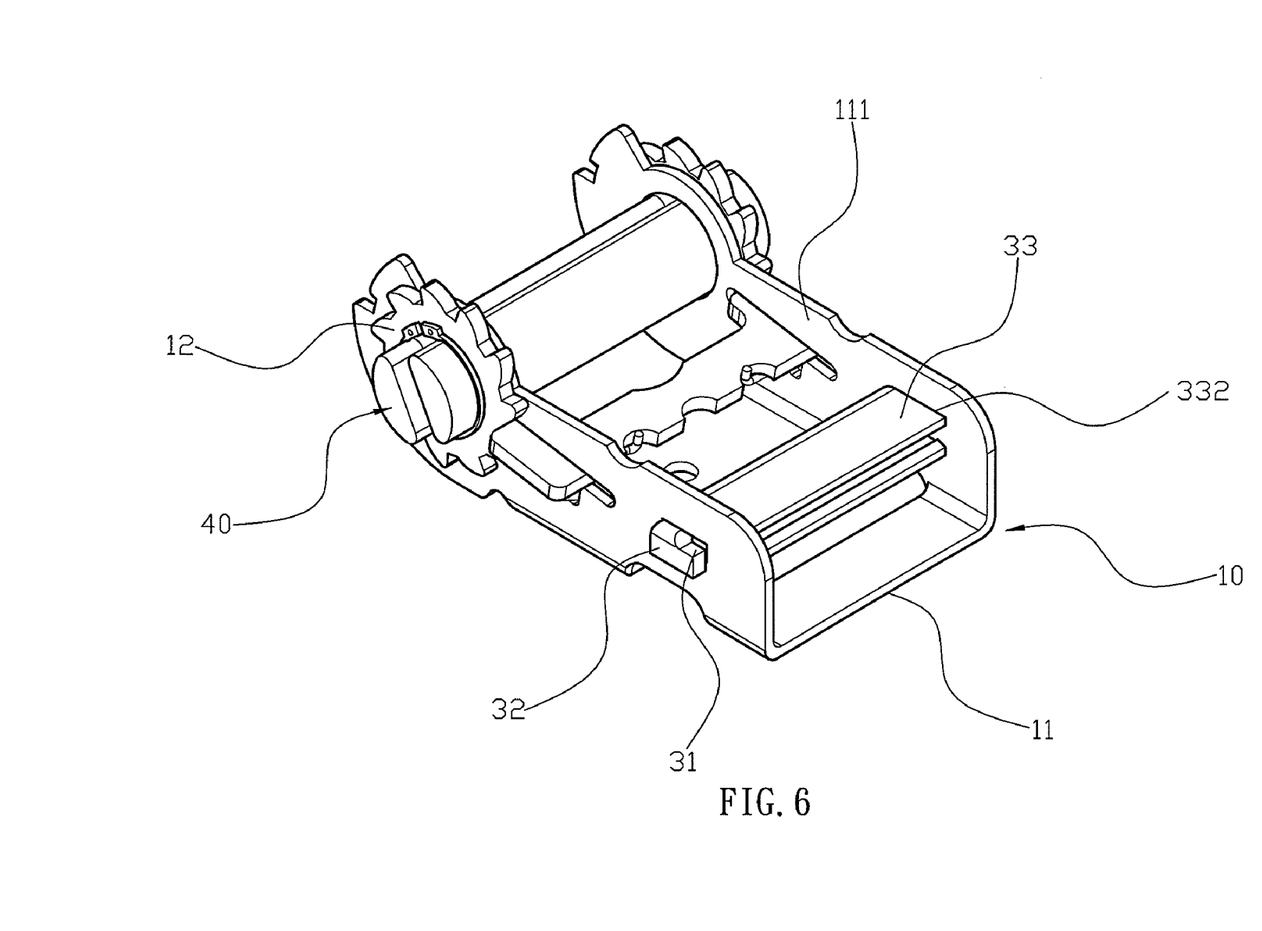
FIG. 6 is a perspective view of a cable tightening device in accordance with another preferred embodiment of the present invention.
Figure 7:
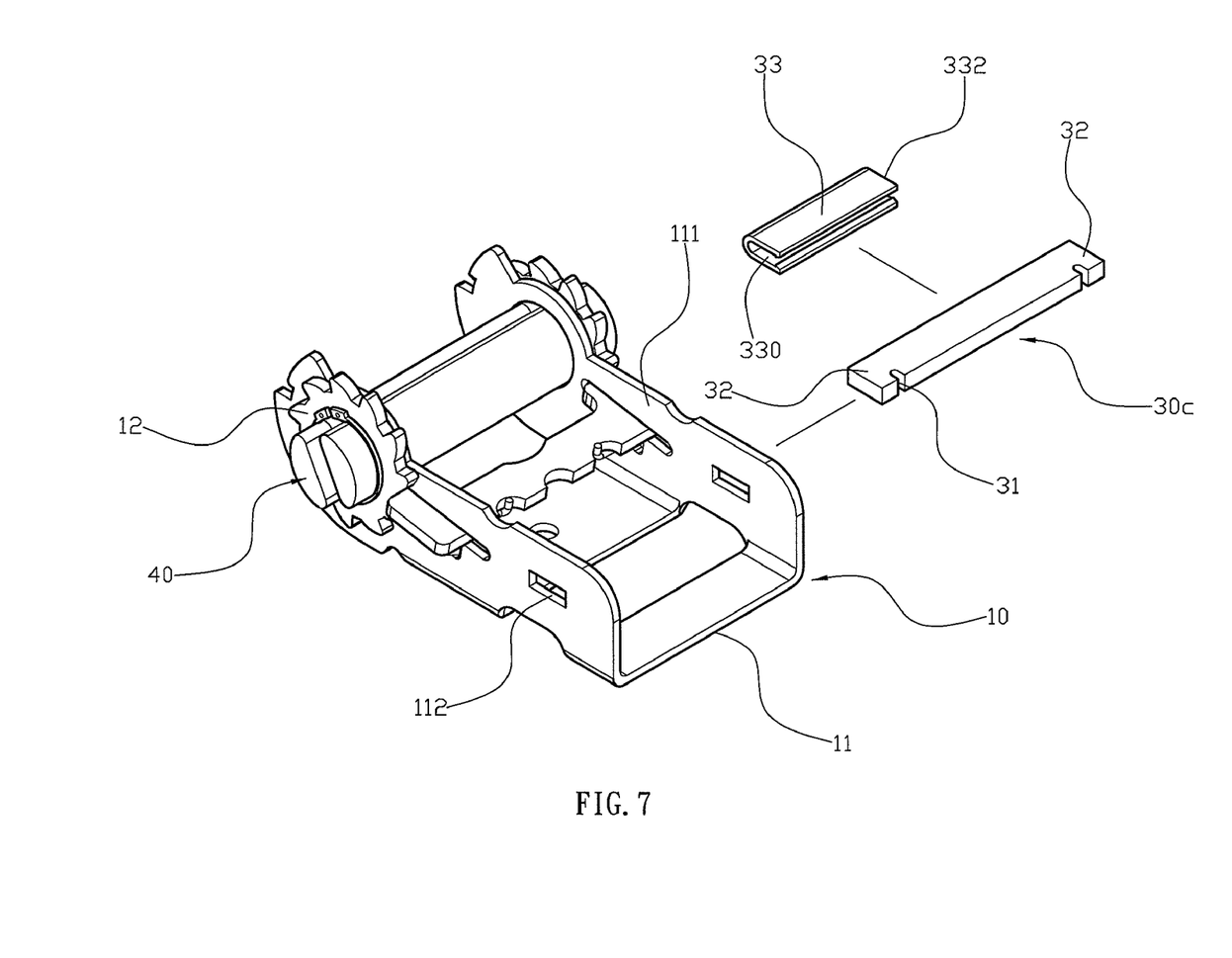
FIG. 7 is an exploded perspective view of the cable tightening device as shown in FIG. 6.

Referring to FIGS. 6 and 7, the holding member 30c is a flat sheet plate, and the cable tightening device further comprises a soft protective jacket 33 mounted on the holding member 30c to surround a periphery of the holding member 30c to prevent the holding member 30c from directly contacting the extension strap 50 as shown in FIG. 3 so as to protect the extension strap 50. The protective jacket 33 is located between the two sidewalls 111 of the base 11 and has two opposite ends 332 each abutting an inner face of a respective one of the two sidewalls 111 of the base 11. The protective jacket 33 has a substantially U-shaped profile and has a hollow inside provided with a receiving groove 330 to receive the holding member 30c. The receiving groove 330 of the protective jacket 33 is directed outwardly and rearward relative to the rotation member 40.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A cable tightening device, comprising:
   a fixed unit including a base;
   a rotation member rotatably mounted on a first end of the base of the fixed unit;
   a movable unit including a movable member rotatably mounted on the rotation member and movable relative to the base of the fixed unit to drive the rotation member to rotate relative to the fixed unit in a oneway direction;
   a holding member secured on a second end of the base of the fixed unit;
   wherein the base of the fixed unit has two opposite sidewalls and a bottom wall located between the two opposite sidewalls;
   the holding member is located between the two sidewalls of the base;
   each of the two sidewalls of the base is provided with a locking slot;
   the holding member is inserted into the locking slot of each of the two sidewalls of the base;
   the holding member has two opposite sides each having two opposite ends each provided with a bent locking piece protruding outwardly from the locking slot of a respective one of the two sidewalls of the base and closely locked onto an outer face of the respective sidewall of the base.

2. The cable tightening device of claim 1, wherein the holding member has two opposite ends each provided with at least one cutout located beside the bent locking piece to define the bent locking piece.

3. The cable tightening device of claim 2, wherein the cutout of the holding member is connected to the locking slot of the respective sidewall of the base.

4. The cable tightening device of claim 2, wherein the holding member has a hollow inside provided with an opening connected to the at least one cutout and directed outwardly and rearward relative to the rotation member.

5. The cable tightening device of claim 1, wherein the holding member has a substantially U-shaped profile.

6. The cable tightening device of claim 1, wherein the holding member has a substantially J-shaped profile.

7. The cable tightening device of claim 1, wherein the holding member has a substantially oblong profile.

8. The cable tightening device of claim 1, wherein the locking slot of each of the two sidewalls of the base has a shape matching a cross-sectional profile of the holding member.

9. The cable tightening device of claim 1, wherein the two opposite sides of the holding member are spaced from each other.

10. The cable tightening device of claim 1, wherein each of the two opposite sides of the holding member is a flat sheet plate.

11. The cable tightening device of claim 1, wherein the holding member locked between the two sidewalls of the base and is combined with the base integrally.

12. The cable tightening device of claim 1, wherein the holding member is disposed at a transverse state and is parallel with and spaced from the bottom wall of the base.

13. The cable tightening device of claim 1, wherein
   the base of the fixed unit is made of a metallic sheet plate;
   the base of the fixed unit has a substantially U-shaped profile;
   the bottom wall of the base has a solid structure.

14. A cable tightening device, comprising:
   a fixed unit including a base;
   a rotation member rotatably mounted on a first end of the base of the fixed unit;
   a movable unit including a movable member rotatably mounted on the rotation member and movable relative to the base of the fixed unit to drive the rotation member to rotate relative to the fixed unit in a oneway direction;
   a holding member secured on a second end of the base of the fixed unit;
   wherein the holding member is a flat sheet plate;
   the cable tightening device further comprises a soft protective jacket mounted on the holding member to surround a periphery of the holding member.

15. The cable tightening device of claim 14, wherein
   the protective jacket is located between the two sidewalls of the base;
   the protective jacket has two opposite ends each abutting an inner face of a respective one of the two sidewalls of the base.

16. The cable tightening device of claim 14, wherein
   the protective jacket has a substantially U-shaped profile;
   the protective jacket has a hollow inside provided with a receiving groove to receive the holding member.

17. The cable tightening device of claim 16, wherein the receiving groove of the protective jacket is directed outwardly and rearward relative to the rotation member.

* * * * *